(12) United States Patent
Okamoto

(10) Patent No.: US 6,877,075 B2
(45) Date of Patent: Apr. 5, 2005

(54) INFORMATION PROCESSOR, INFORMATION PROCESSING METHOD AND INFORMATION PROCESSING PROGRAM AND RECORDING MEDIUM

(75) Inventor: Akihiko Okamoto, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 321 days.

(21) Appl. No.: 10/309,263

(22) Filed: Dec. 4, 2002

(65) Prior Publication Data

US 2003/0105930 A1 Jun. 5, 2003

(30) Foreign Application Priority Data

Dec. 5, 2001 (JP) ........................................ 2001-371926
Oct. 3, 2002 (JP) ........................................ 2001-290686

(51) Int. Cl.[7] .............................................. G06F 13/00
(52) U.S. Cl. ...................................... 711/154; 711/163
(58) Field of Search ................................. 711/154, 163

(56) References Cited

U.S. PATENT DOCUMENTS

| 5,070,494 | A | 12/1991 | Emoto |
| 5,301,179 | A | 4/1994 | Okamoto |
| 5,351,228 | A | 9/1994 | Kanno |
| 5,787,063 | A | 7/1998 | Kanno |
| 5,912,870 | A | 6/1999 | Kanno |
| 6,137,760 | A | 10/2000 | Okamoto |
| RE37,093 | E | 3/2001 | Okamoto |
| 6,198,712 | B1 | 3/2001 | Okamoto |
| 6,329,035 | B1 | 12/2001 | Iwasaki |
| 6,711,165 | B1 * | 3/2004 | Tzeng ........................ 370/392 |
| 6,728,255 | B1 * | 4/2004 | Tzeng ........................ 370/428 |
| 2002/0191506 | A1 | 12/2002 | Okamoto |

* cited by examiner

Primary Examiner—Reba I. Elmore
(74) Attorney, Agent, or Firm—Dickstein Shapiro Morin & Oshinsky LLP

(57) ABSTRACT

An information processor, wherein the information can be maintained without depending on the storage capacity of the memory portion and the searching for the information can be simplified. According to the information provided from outside and stored in the memory portion, the specific information for specifying this information is sorted and maintained. When the capacity not recorded yet in the memory portion is smaller than the basic information amount, a part of the information stored in the memory portion is stored on a portable information-recording medium and is erased from the memory portion. The identification information for identifying the information-recording medium recorded with the information is corresponded to and stored in the specific information corresponding to the information erased from the memory portion in the specific information that has been stored and maintained. As a result, in the case when the information is assigned, the place maintained (stored or recorded) with this information can be specified according to the specific information.

24 Claims, 9 Drawing Sheets

INFORMATION PROCESSOR, INFORMATION PROCESSING METHOD AND INFORMATION PROCESSING PROGRAM AND RECORDING MEDIUM

CROSS-REFERENCE TO RELATED APPLICATION

This application claims the priority benefit of Japan application serial no. 2001-371926, filed on Dec. 5, 2001 and 2002-290686, filed on Oct. 3, 2002.

BACKGROUND OF THE INVENTION

1. Field of the Invention

This invention relates in general to an information processor, an information processing method, an information processing program and a recording medium 2. Description of Related Art Regarding information-recording media such as videotapes and DVD+RW etc., there is a recorder for recording video information such as television programs (videorecording, herein after).

In a recorder, the video recording information, such as the channel of the program, the date and the start recording time to be video recorded are preset, so that when the program is televising, it can be video recorded without an operator performing a recording operation at that time (recording-preset, herein after). When an operator uses this kind of recorder, for example to continuously preset programs to be recorded at different televising times, he first assigns the video-recording information of the programs to be recorded respectively and then sets the information-recording media, such as videotapes and DVD+RW etc. for recording video information of assigned programs. The recorder will activate the video recording on the information-recording medium in sequence when the start recording times arrive.

In the case when an operator uses this kind of recorder to continuously preset video recording of programs at different televising times, the first and the next video information are video recorded on the set information-recording medium. For example, if the programs in different genres, such as dramas and movies, are continuously video recorded, different genre of video information will be recorded and mixed on one information-recording medium.

The recording media for video-recording the video information is maintained in the cases where names of the programs are written.

However, in the case when an information-recording medium is recorded with a lot of video information, lots of information, such as names of programs, will be written on the case. The more the information recorded on the recording medium the more the information will be written on the case. It becomes complex to identify the contents of the information recorded on the information-recording medium by reading the information written on the case. Therefore, it is difficult to rapidly reproduce the target video information.

For solving this the problem, a technique is provided to sort the video information into "documentary", "drama" and "movie" directories and save them on a memory device (Japan Laid-open no. 2000-285647). In this technique, the target video information can be searched for in the directories, such that the searching can be simplified.

However, in the technique mentioned above, the storage capacity of the memory unit is limited. Though the searching for video information can be simplified, the amount of the video information capable of being searched depends on the storage capacity of the memory unit.

Moreover, because the technique is limited by the storage capacity of the memory unit, the programs may be incompletely recorded even if the video-recording is preset due to the insufficient capacity of what is not recorded yet (the left capacity). In order to prevent this drawback, the operator has to select and delete some information he does not want so that the operation becomes complex.

SUMMARY OF THE INVENTION

It is an object of the present invention to record the information without depending on the storage capacity of the memory unit and to simplify the searching for the recorded information.

According to the foregoing description, an object of this invention is to provide an information processor, comprising: a memory portion capable of erasing an information; a memory unit, selectively sorting an information provided from outside in the memory portion; a specific-information-obtaining unit, obtaining a specific information for specifying the information stored in the memory portion by using the memory unit; a sorting-and-maintaining unit, sorting and maintaining the specific information obtained by using the specific-information-obtaining unit according to the information stored in the memory portion by using the memory unit; a left capacity judging unit, judging whether a capacity that is not recorded yet in the memory portion is smaller than a basic information amount; a record-erasing unit, storing a part of the information stored in the memory portion on a portable information-recording medium and erasing the part of the information from the memory portion when the left capacity judging unit judges that the capacity not yet recorded is smaller than the basic information amount; an identification-information-obtaining unit, obtaining an identification information for identifying the information-recording medium recorded with the information by using the record-erasing unit; and a corresponding unit, corresponding and storing the identification information obtained by using the identification-information-obtaining unit to the specific information corresponding to the information erased from the memory portion by the record-erasing unit in the specific information sorted and maintained by using the sorting-and-maintaining unit.

Therefore, according to the information that is provided from outside and selective stored in the memory portion, the specific information for specifying this information is sorted and maintained. When the capacity not recorded yet in the memory portion is judged to be smaller than the basic information amount, a part of the information stored in the memory portion is stored on the portable information-recording medium and is erased from the memory portion. The identification information for identifying the information-recording medium stored with this information is corresponded to and stored in the specific information corresponding to the information erased from the memory portion in the specific information that has been maintained and stored. As a result, in the case when the information is assigned, the place maintained (stored or recorded) with this information can be specified according to the specific information.

The record-erasing unit erases the information from that stored in the memory portion at an earlier date and time.

Therefore, the information in the memory portion is erased from that stored at an earlier date and time. As a result, the information just stored in the memory portion will not be moved to the information-recording medium.

The left capacity judging unit judges whether the capacity not recorded yet is smaller than the basic information amount in each sort classification of the sorting-and-maintaining unit. The record-erasing unit erases the information from that stored at an earlier date and time in the sort classification where the left capacity judging unit judges the capacity not recorded yet is smaller than the basic information amount.

Therefore, whether the capacity not recorded yet is smaller than the basic information amount is judged in each sort classification. In the sort classification where the capacity not recorded yet is judged to be smaller than the basic information amount, the information is erased from that stored at an earlier date and time. As a result, the capacity not recorded yet in the memory portion can be managed in each sort classification.

The left capacity judging unit judges whether the capacity not recorded yet is smaller than the basic information amount when recording the information by using the memory unit.

Therefore, during recording the information, the capacity not recorded yet is judged as to whether it is smaller than the basic information amount. As a result, the left capacity left in the memory portion can be maintained over and above the basic information amount during recording the information.

The left capacity judging unit judges whether the capacity not recorded yet is smaller than the basic information per regulation time interval.

Therefore, whether the capacity not recorded yet is smaller than the basic information amount is judged per regulation time interval. As a result, the left capacity left in the memory portion can be maintained over and above the basic information amount in every regulation time interval.

According to another aspect of the invention, the information processor can further comprise: an input unit, inputting a keyword; a specific-information-searching unit, searching the specific information including the keyword input by using the input unit from the specific information stored by using the corresponding unit; an identification-information-obtaining unit, obtaining the identification information corresponding to the specific information searched by the specific-information-searching unit; and an identification-information-outputting unit, outputting the identification information obtained by the identification-inform ation-obtaining unit.

Therefore, the specific information that includes the keyword input by the input unit is searched for in the stored specific information, and the identification information corresponding to this specific information is output. As a result, according to the input keyword, the place maintained (stored or recorded) with the information as the target can be specified.

According to still another aspect of the invention, there is provided an information processing method, used in an information processor comprising a memory portion capable of erasing an information, a memory unit for selectively storing an information provided from outside in the memory portion, comprising: a specific-information-obtaining step, for obtaining a specific information for specifying the information stored in the memory portion; a sorting-and-maintaining step, for sorting and maintaining the specific information according to the information stored in the memory portion; a record-erasing step, for storing a part of the information stored in the memory portion on a portable information-recording medium and erasing the part of the information from the memory portion when a capacity not yet recorded in the memory portion is smaller than a basic information amount; an identification-information-obtaining step, for obtaining an identification information for identifying the information-recording medium; and a corresponding step, for corresponding and storing the obtained identification information to the specific information corresponding to the information erased from the memory portion in the specific information that has been stored and maintained.

Therefore, according to the information that is provided and selectively stored in the memory portion, the specific information for specifying this information is sorted and maintained. When the capacity not recorded yet in the memory portion is smaller than the basic information, a part of the information stored in the memory portion is stored on the portable information-recording medium and erased from the memory portion. The identification information for identifying the information-recording medium recorded with this information is corresponded to and stored in the specific information corresponding to the information erased from the memory portion in the specific information that has been sorted and maintained. As a result, in the case when the information is assigned, the place maintained (stored or recorded) with this information can be specified according to the specific information.

In the record-erasing step, the information is erased from that stored in the memory portion at an earlier date and time.

Therefore, the information in the memory portion is erased from that stored at an earlier date and time. As a result, the information just stored in the memory portion will not be erased from the memory portion by moving the information to the information-recording medium.

In the record-erasing step, the capacity not recorded yet is judged whether it is smaller than the basic information amount in each sort classification of the specific information. In the information in the sort classification where the capacity not recorded yet is judged to be smaller than the basic information amount, the information is erased from that stored at an earlier date and time.

Therefore, whether the capacity not yet recorded is smaller than the basic information is judged in each sort classification. In the information in the sort classification where the capacity not yet recorded is judged to be smaller than the basic information amount, the information is erased from that stored at an earlier date and time. As a result, the capacity not yet recorded yet in the memory portion can be managed in each sort classification. Moreover, the information just stored in the memory portion will not be erased from the memory portion by moving the information to the information-recording medium.

In the record-erasing step, during recording of the information in the memory portion, the capacity not recorded yet is judged as to whether it is smaller than the basic information amount.

Therefore, during recording the information, whether the capacity not recorded yet is smaller than the basic information amount is judged. As a result, during recording the information, the left capacity left in the memory portion can be always maintained over and above the basic information amount.

In the record-erasing step, the capacity not recorded yet is judged whether it is smaller than the basic information amount per regulation time interval.

Therefore, whether the capacity not yet recorded is smaller than the basic information amount is judged per regulation time interval.

According to still another aspect of the invention, the information processing method can further comprise: a specific-information-searching step, for searching for the specific information including a keyword input by using a input unit for inputting the keyword from the specific information stored in the memory portion; an identification-information-obtaining step, for obtaining the identification information corresponding to the searched specific information; and an identification-information-outputting step, for outputting the obtained identification information.

Therefore, the specific information including the keyword input by the input unit is searched for in the stored specific information, and the identification information corresponding to this specific information is output. As a result, according to the input keyword, the place maintained (stored or recorded) with the information as the target can be specified.

According to still another aspect of the invention, there is provided an information processing program, used in a computer provided by an information processor comprising a memory portion capable of erasing an information and a memory unit selectively storing the information provided from outside in the memory portion, comprising: a memory function for selectively storing the information provided from outside in the memory portion; a specific-information-obtaining-function for obtaining a specific information for specifying the information stored in the memory portion; a sorting-and-maintaining function for sorting and maintaining the specific information according to the information stored in the memory portion; a record-erasing function for storing a part of the information stored in the memory portion on a portable information-recording medium and erasing the part of the information from the memory portion when a capacity not yet recorded in the memory portion is smaller than a basic information amount; an identification-information-obtaining function for obtaining an identification information for identifying the information-recording medium; and a corresponding function for corresponding the obtained identification information to the specific information corresponding to the information erased from the memory portion in the specific information that is sorted and maintained.

Therefore, according to the information that is provided from outside and selectively stored in the memory portion, the specific information for specifying this information is sorted and maintained. When the capacity not yet recorded in the memory portion is judged to be smaller than the basic information amount, a part of the information stored in the memory portion is stored on the portable information-recording medium and is erased from the memory portion. The identification information for identifying the information-recording medium recorded with this information is corresponded to and stored in the specific information corresponding to the information erased from the memory portion in the specific information that has been sorted and maintained. As a result, when the information is assigned, the place maintained (stored or recorded) with this information can be specified according to the specific information.

The record-erasing function is for erasing the information from that stored in the memory portion at an earlier date and time.

Therefore, the information in the memory portion is erased from that stored at an earlier date and time. As a result, the information just stored in the memory portion will not be erased from the memory portion by moving the information to the information-recording medium.

The record-erasing function is for judging whether the capacity not recorded yet is smaller than the basic information amount in each sort classification of the sorting-and-maintaining unit and erasing the information in the sort classification where the capacity not recorded yet is judged to be smaller than the basic information amount from that stored at an earlier date and time.

Therefore, whether the capacity not recorded yet is smaller than the basic information amount is judged in each sort classification. In the information in the sort classification where the capacity not recorded yet is smaller than the basic information amount, the information is erased from that stored at an earlier date and time. As a result, the capacity not yet recorded in the memory portion can be managed in each sort classification. Moreover, the information just stored in the memory portion will not be erased from the memory portion by moving the information to the information-recording medium.

The record-erasing function is for judging whether the capacity not recorded yet is smaller than the basic information amount, during recording the information in the memory portion.

Therefore, during recording the information, whether the capacity not recorded yet is smaller than the basic information amount is judged. As a result, during recording of the information, the left capacity left in the memory portion can be always maintained over and above the basic information amount.

The record-erasing function is for judging whether the capacity not yet recorded is smaller than the basic information amount per regulation time interval.

Therefore, whether the capacity not yet recorded is smaller than the basic information amount is judged per regulation time interval. As a result, in each regulation time interval, the left capacity left in the memory portion can be always maintained over and above the basic information amount.

According to still another aspect of the invention, the information processing program can further comprise: a specific-information-searching function for searching for specific information including a input keyword from the stored specific information; an identification-information-obtaining function for obtaining the identification information corresponding to the searched specific information, and an identification-information-outputting function for outputting the obtained identification information.

Therefore, the specific information including the input keyword is searched for in the stored specific information, and the identification information corresponding to this specific information is output. As a result, according to the input keyword, the place maintained (stored or recorded) with the information as the target can be specified.

According to still another aspect of the invention, there is provided a recording medium, capable of storing and mechanically reading the information processing program.

Therefore, the effects same as above can be achieved.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

One embodiment of the present invention will be explained referring to FIGS. 1 to 6. This embodiment is an example suitable for video recording/reproducing system.

Figure 1:
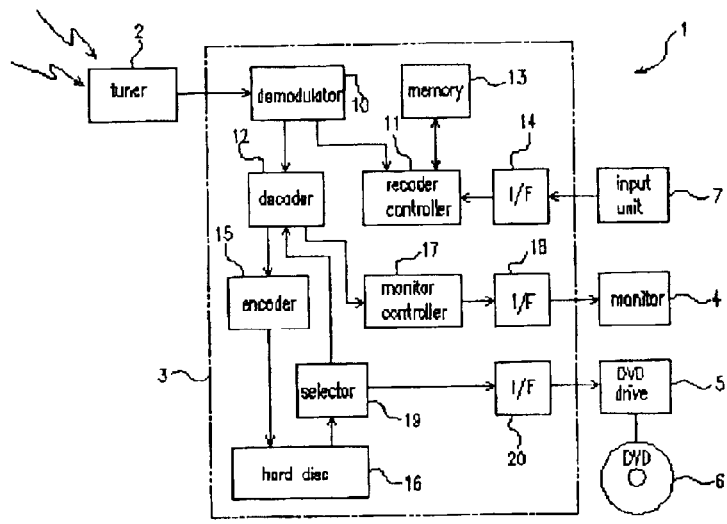
FIG. 1 is a schematic block diagram showing the video recording/reproducing system 1 according to the first embodiment of the present invention.

FIG. 1 is a schematic block drawing showing the video recording/reproducing system according to the first embodiment of the present invention. The video recording/reproducing system 1 comprises: a tuner 2, a recorder 3 serving as an information processor in which a HDD (Hard Disc Drive) is built, a monitor 4, a DVD recorder 5 (the DVD drive in FIG. 1) capable of recording/reproducing a recordable DVD (Digital Versatile Disc) 6.

The explanation and drawings of the public technique are omitted. The tuner 2 comprises an antenna for receiving the high-frequency energy via space, a high-frequency amplifier for amplifying the high-frequency signals received by the antenna and a frequency converter for changing the received frequencies into intermediate frequencies. The frequency converter comprises a partial oscillator oscillating some frequencies, which make only the intermediate frequencies from the received frequencies change, and a mixer adding the input signals and the output of the partial oscillator to generate the intermediate frequencies. The tuner 2 modulates the received high-frequency energy and outputs it to the recorder 3.

The recorder 3 uses the tuner 2 for receiving and uses the demodulator 10 to demodulate the output signals, which has been modulated, and uses the demultiplexer etc. to demultiplex the video information including the image and sound information, and the EPG (Electric Program Guide) information. The EPG information is output to the recorder controller 11 and the video information is output to the decoder 12.

Here, the EPG information is a guide information, such as genres of the programs and the contents, the actors and the predetermined televising time, shown on the television picture. The EPG information is set according to the contents of the programs (video information) and is transmitted by data broadcasting.

The recorder controller 11, which is input with the EPG information, is provided with the microcomputer (not shown) driving and controlling each unit comprising the recorder 3. The microcomputer is structured by connecting the CPU integrally driving and controlling each unit comprising the recorder 3, the ROM storing controlling programs etc. and the RAM serving as the work area of the CPU.

In this embodiment the ROM is stored with the information-processing program for the information maintaining process and information searching process. As a result, the recording medium is practiced by using the ROM in this embodiment.

Though the recording medium is practiced by using the ROM in this embodiment, it should not be a limitation. A RAM can also be used to practice the recording medium. Moreover, the DVD 6 recorded with information-processing program can also be used as the recording medium and the program can be read by using the DVD recorder 5.

The ID information area (not shown) storing the ID information a~g (see FIG. 2) fixed on the DVD 6, which is set by the DVD recorder 5, is maintained in the RAM. The ID information stored on the ID information area is set by using various key operations of the input unit 7, which is connected to the recorder 3, by an operator through the I/F 14. The ID information a~g is regarded as the fixed number marked on the DVD 6.

The input unit 7 is provided with various function keys, such as presetting keys for setting preset modes in order to set the necessary video-recording information during presetting the video record, and character-number keys. Moreover, the input unit 7 is provided with a cursor key, which is operated when selecting information displayed on the monitor, and a determination key that is operated when determining the information selected by using the cursor key. The various information input by using the input unit 7 is input to the recorder controller 11 through the I/F 14.

Furthermore, the input unit 7 can be connected to the recorder 3 by wires and also can be connected to the recorder 3 wirelessly such as by the remote control.

Figure 2:
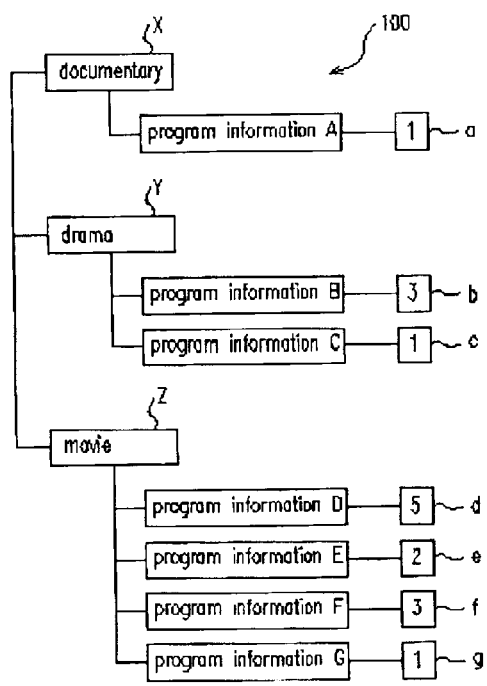
FIG. 2 shows a directory of a file structure.

The memory 13 that is rewritable and can be stored with various information is connected to the recorder controller 11. In the memory 13, the directory 100 which groups the specific information related to various video information into genres X, Y, Z such as documentary, drama and movie types is stored, as shown in FIG. 2. The program information A~G includes video-recording information such as actors, dates of various video information and the timing for video-recording taken from the EPG information.

Each ID information a~g fixed on the DVD 6 stored with the video information corresponding to each program information A~G is corresponded with each program information A~G in the directory 100. The ID information a~g of this embodiment which is input with the operation of the input unit 7 by an operator is regarded as the fixed number marked on various DVD 6.

In the present embodiment, though various video information is grouped into and maintained as genres X, Y, Z such as documentary, drama, movie types, it should not be a limitation to the grouping method. For example, the movie genre can be further grouped into more details such as action, suspense, SF. Moreover, it can be sorted according to actors without being grouped into genres X, Y, Z.

The decoder 12 input with the video information decodes the input video information. By using the demultiplexer etc. the video information is demultiplexed and is output to the encoder 15 in image and sound information.

The encoder 15 multiplexes the image and sound information and outputs them to the hard disc 16 serving as the memory unit.

The drawings and explanation of the public technique are omitted. The hard disc 16 is provided with flat magnetic discs spread with magnetic material on the surface thereof and a magnetic head for recording/reproducing various information such as video information on the magnetic discs. When recording various information, the hard disc 16 drives the magnetic head according to the driving signals from the recorder controller and records the information on the magnetic discs. When reproducing the information, the hard disc 16 drives the magnetic head according to the driving signals from the recorder controller and reproduces the information recorded on the magnetic discs. The storing of the records of information on the hard disc 16 is discriminated from the records of the information on the DVD 6 and will be explained as follows.

In the recorder, regarding information other than that demodulated in the demodulator 10, the information reproduced on the hard disc is input through the selector 19. The video information input to the decoder 12 is output to the monitor 4 through the monitor controller 17 driven and controlled by the recorder controller 11, and the I/F 18.

The drawings and explanation of the public technique are omitted. The monitor 4 is provided with a display unit for displaying the information and a speaker for outputting the sound. Moreover, the monitor 4 is provided with an I/F for sending and receiving information between the monitor 4 and the recorder 3. In the video information received through the I/F in the monitor 4, the image information is output through the display unit and the sound information is output through the speaker.

During the following information maintaining processing, the selector 19 selects the information recorded on the DVD 6 and the video information reproduced from the hard disc 16 and outputs it to the DVD recorder 5 through the I/F 20.

The drawings and explanation of the public technique are omitted. The DVD recorder 5 comprises a rotating mechanism for rotating the turntable set by the recordable DVD 6, such as DVD-RAM, DVD-RW, DVD+RW, and an optical pickup for radiating laser beam to the recording surface of the DVD 6. The information is recorded on the DVD 6 according to the information transmitted through the recorder 3. The information reproduced from the DVD 6 is output to the recorder 3.

Figure 3:
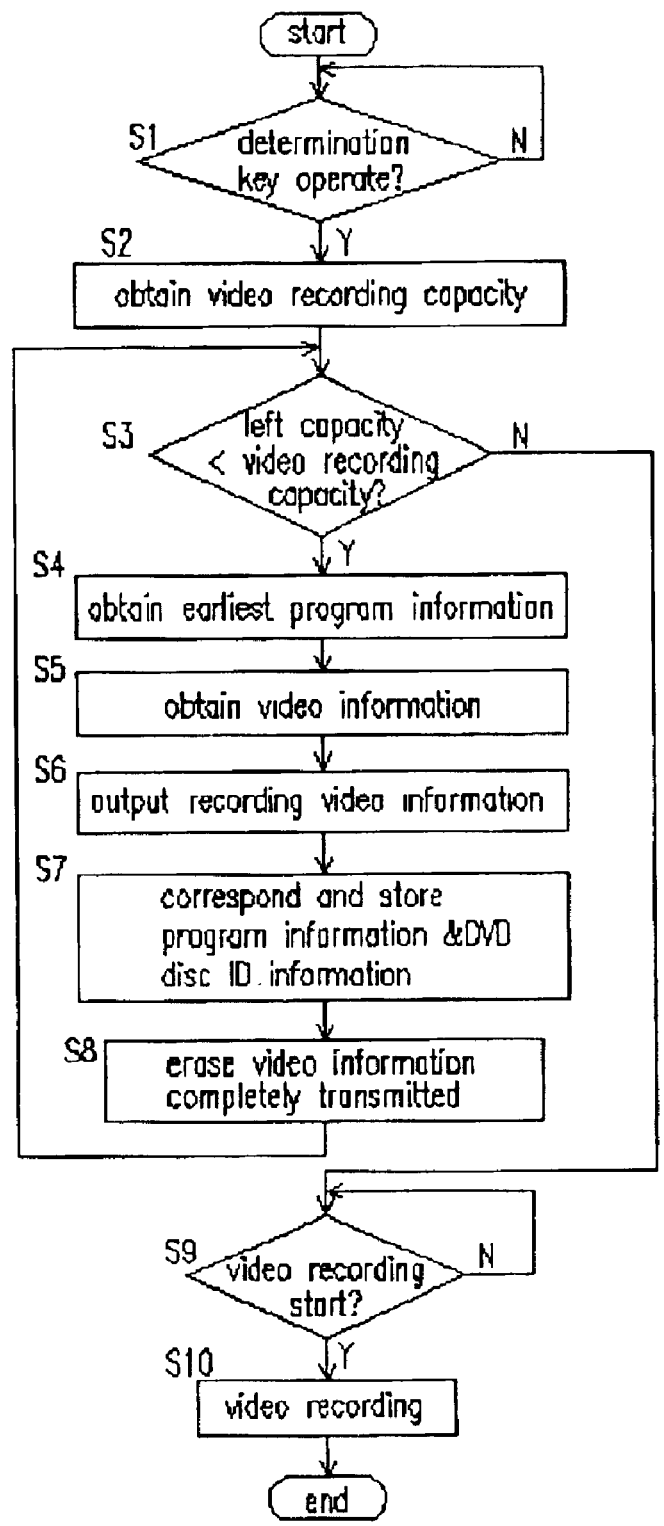
FIG. 3 is a schematic flow chart showing the information maintaining process.

Next, in various processes for practicing the video recording/reproducing system, the information-maintaining process for presetting the video record of the programs televised will be explained referring to FIG. 3. FIG. 3 is a schematic flow chart for explaining the information-maintaining process. First, when presetting the video record, the operator operates the input unit 7 under the condition of presetting mode and inputs the date and the time for starting to record, the time for ending the record, the channel to record and the genre of the program etc.

In the information-maintaining process, the presetting is judged in a stand by state (N in step S1) till the operator operates the determination key under the condition of the presetting mode, and the presetting is judged in a completed state (Y in step S1) after the operator operates the determination key, and then the capacity of the video record is obtained (S2) according to the presetting information that is already set.

After that, the hard disc 16 is searched, and then it is compared whether the capacity of the video record is larger or smaller than the capacity that has not been recorded yet (the left capacity) (S3), by using the step S3 to practice the function of judging the left capacity.

If it is judged that the capacity of the video record is larger than the left capacity on the hard disc 16 (Y in stop S3), the directory 100 will be searched to obtain the earliest program information according to the video recording information (S4).

After that, the video information corresponding to the obtained program information is obtained (S5). The reading-video-information which makes the recording command that makes the video information be recorded on the DVD 6 be combined is output to the DVD recorder 5 through the I/F 20.

It is not shown in the drawing that the DVD recorder 5 is judged in a stand by state till the recorded-video-information that is output through the recorder 3 is received, and after the DVD recorder 5 has judged that the recording-video-information that is output through the recorder 3 has been received, the recording-video-information combined to the recording command of the recording-video-information will be recorded on the DVD 6 according to the receiving recorded video information.

The recorder 3 makes the ID information stored on the ID area correspond to the program information related only to the video information completely transmitted and stores it to the directory 100 (S7). Here, by using the step S7, the identification-information-obtaining unit and the function of obtaining the identification-information are practiced. Moreover, by using the step S7, the corresponding unit and the function of corresponding are practiced. Furthermore, by using the step S7, the identification-information-obtaining step and the corresponding step are practiced.

Here, the program information in the directory 100 is sorted and maintained according to the EPG included thereof. By using the specific information-obtaining unit, the function of obtaining the specific information is practiced. Moreover, by using the sorting-and-maintaining unit, the function of sorting and maintaining the information is practiced. Furthermore, the specific-information-obtaining step and the sorting-and-maintaining step are practiced. Though the information is grouped into genres to be maintained in the present embodiment, it should not be a limitation. For example, the information can also be grouped into actors. Moreover, the information is not limited as the EPG one. For example, the information also can be sorted to be maintained according to the video information such as the date of the video record and the time to record.

Additionally, the video information that the transmission is completed is erased from the hard disc 16 (S8) and then the process moves to step S3. As a result, the left capacity of the recorder 3 is increased. Here, by using the steps S4, S5, S6 and S8, the record-erasing unit and the function of erasing record thereof are practiced. Therefore, the record-erasing step is practiced.

After that, the hard disc 16 will be searched. If it is judged that the capacity of the video record is smaller than the left capacity on the hard disc 16 (N in step S3), it is kept in a stand by state till it is judged that the start recording time has arrived due to the counting function of the CPU according to its measuring time and the presetting information that is already set (N in step S9).

After it is judged that the start recording time has arrived due to the counting function of the CPU according to its measuring time and the presetting information that is already set (Y in step S9), the hard disc 16 is driven so that the video information that is received through the tuner 2 is stored on the magnetic disc (S10). Here, by using the step S10 the function of the memory unit is practiced.

As a result, when presetting video record, the required storage capacity for video record of the program that is preset can be kept before start video recording. Therefore, the information can be maintained without depending on the storage capacity of the hard disc 16. The drawback that the video recording could not be completed due to the insufficient of the storage capacity of the hard disc 16 can be prevented. The program that is preset can be video recorded without a complex operation acted by an operator.

Figure 4:
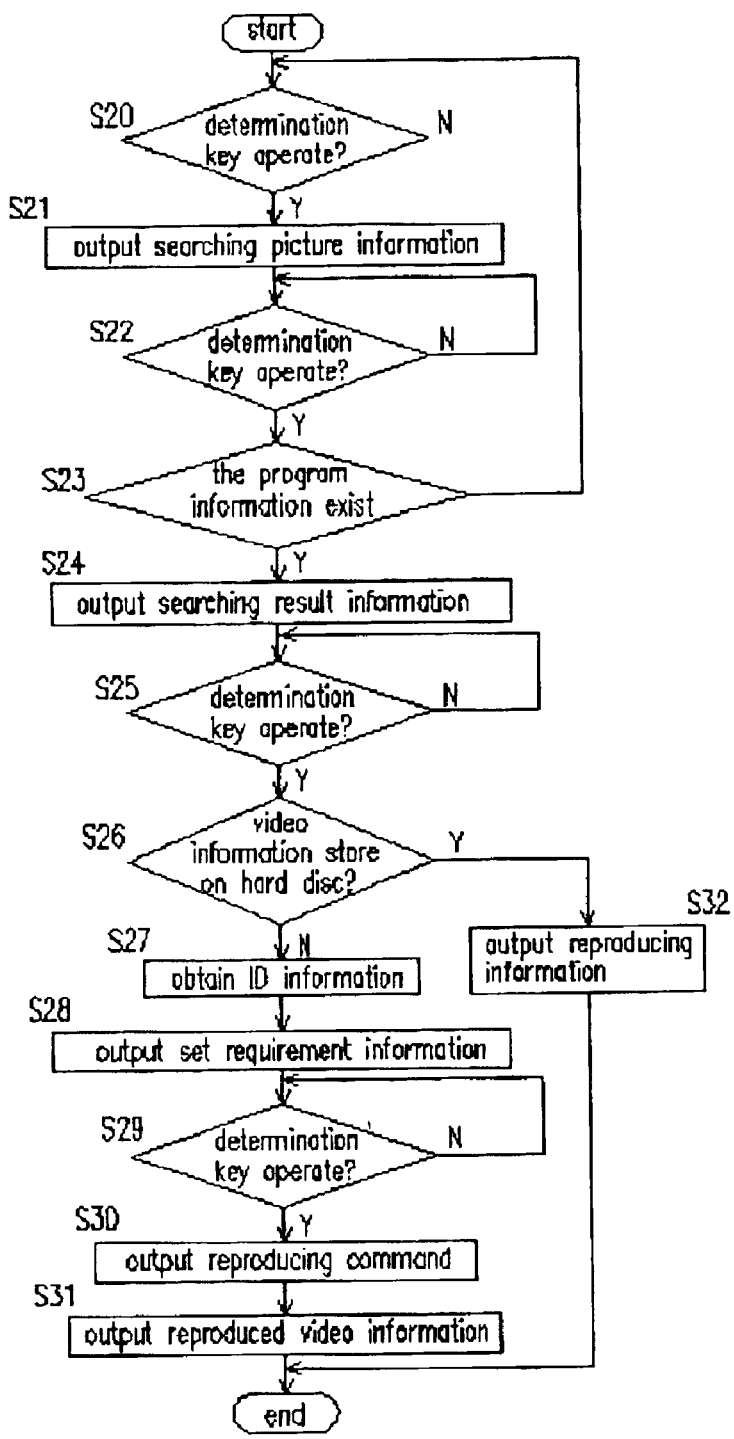
FIG. 4 is a schematic flow chart showing the information searching process.

Next, by practicing the information storing process, the information searching process which is practiced when reproducing the video information that is stored on the hard disc 16 or the DVD 6 is explained referring to FIG. 4. FIG. 4 is a schematic flow chart for explaining the information-searching process. First, it will be in a stand by state till it is judged that the determination key is operated by an operator under the condition of searching mode (N in step S20).

Under the condition of setting the searching mode, when it is judged that the determination key is operated by an operator (Y in step S20), the searching picture information combined with the picture information of the searching picture and the display command that makes the picture information be displayed on the monitor 4 will be output to the monitor 4 through the I/F 18 (S21).

The explanation of the public technique is omitted. In the case when the monitor 4 receives the searching picture information output through the recorder 3, the picture information combined to the display command will be displayed on the display unit of the monitor 4 according to the display command included in the searching picture information.

Under the condition that the searching picture is displayed on the display unit of the monitor 4, the operator operates the input unit 7 and inputs the keyword related to the video information as the target to the input column and operates the determination key. Here, the function of inputting provided by the input unit is practiced. The keywords input by the operator is the information including the program information such as genres, actors, dates and time to record.

Under the condition that the initial searching picture is displayed on the display unit of the monitor 4, it is in a stand by state till it is judged that the determination key is operated (N in step S22). Under the condition that the searching picture is displayed on the monitor 4, after it is judged that the action key is operated (Y in step S22), the directory 100 will be searched and judged whether the program information exists in the input keywords (S23). Here, by using the step 23, the specific information-searching unit and the function of searching the specific information are practiced. Moreover, the specific information-searching step is practiced here.

When searching the directory 100, after it is judged that the program information exists in the input keywords (Y in step S23), the searching result information combined with the displaying command that makes the program information be displayed on the monitor 4 is output to the monitor 4 through the I/F 15 (S24).

As described above, in the case when the monitor 4 receives the searching result information output through the recorder 3, the program information combined to the displaying command will be displayed on the display unit.

Under the condition that the searched program information is displayed on the monitor 4, the operator operates the input unit to assign the program information as the target and operates the determination key.

Under the condition that the program information is displayed on the display unit of the monitor 4, it is in a stand by state till the determination key is operated (N in step S25). Under the condition that the searched program information is displayed on the display unit of the monitor 4, after it is judged that the determination key is operated (Y in step S25), the directory 100 will be searched and judged as to whether the video information corresponding to the assigned program information is recorded on the hard disc 16 (S26).

By searching the directory 100, if it is judged that the video information corresponding to the program information as the assigned target is not recorded on the hard disc 16 (N in step S26), the directory 100 will be searched and the ID information a~g of the DVD 6 recorded with the assigned video information will be obtained (S27). Here, the identification-information-obtaining step is practiced.

The setting requirement information combined with the obtained ID information and the displaying command that makes the ID information a~g be displayed on the display unit of the monitor 4 is output to the monitor 4 through the I/F 18 (S28). Here, in step S28, the identification information output unit and the function of outputting the identification information are practiced.

Same as the above description, when the monitor 4 receives the setting requirement information output through the recorder 3, the ID information combined to the displaying command is displayed on the display unit of the monitor 4, and the guide message such as "Please set the No. 1 DVD and operate the determination key" is displayed according to the displaying command included in the setting requirement information.

The operator sees the ID information displayed on the display unit of the monitor 4 and sets the DVD 6 with this ID information on the turntable and operates the determination key by using the input unit 7.

Under the condition that the ID information is displayed on the display unit of the monitor 4, it is in a stand by state till it is judged that the determination key is operated (N in step S29). Under the condition that the ID information is displayed on the display unit of the monitor 4, after it is judged that the determination key is operated (Y in step S29), the reproducing command that makes the set DVD 6 be reproduced is output to the DVD recorder 5 through I/F 20 (S30).

The explanation of the public technique is omitted. The DVD recorder 5 reproduces the assigned video information and outputs the reproduced video information to the recorder 3 according to the reproducing command output through the recorder 3.

The recorder 3 uses the selector to select the reproducing information transmitted through the DVD recorder 5 and outputs it to the monitor 4 through the monitor controller 17 and the I/F 18 (S31).

As described above, the monitor 4 outputs the video information received through the recorder 3 through the display and the speaker.

By searching the directory 100, if it is judged that the video information corresponding to the program information as the assigned target is recorded on the hard disc 16 (Y in step S26), the video information will be reproduced on the hard disc 16 and output to the monitor 4 through the monitor controller 17 and I/F 18 (S33).

In the present embodiment, because the program information A~G corresponding to the ID information a~g in the directory 100 and is stored in the directory 100, by using the directory 100 which video information is stored and where the video information is stored can be managed. As a result, even though the video information to be reproduced is not recorded on the hard disc 16, the searching for the video information as the target can be simplified.

Moreover, in the case when one DVD 6 is recorded with a plurality of video information, the recorded titles are unnecessary to be written.

Though the value, which serves as the ID information a~g for identifying the DVD 6 that is the transmitting object of the video information, marked on each DVD 6 is input in the present embodiment, it should not be a limitation. For example, numbers such as "1, 2, 3 . . . " can also be input as the ID information a~g, and the alphabets such as "A, B, C . . . " can also be input as the ID information a~g. In this condition, the ID information a~g set and input by the operator himself is made to correspond to the DVD 6. In this way, for example, the ID information a~g can be written on the non-recording surface of the DVI) 6 in advance by using a Magic Marker® and printing etc. Especially, in the case when the ID information a~g is written by printing, the DVD 6 that it is easy to read and makes no interference to its appearance can be provided.

Moreover, in the present embodiment, when the information including the program information such as genres, actors, dates and times to record is regarded as the keyword, because the video information can be searched in keywords, the DVD recorded with only movies can be made.

Figure 5A:
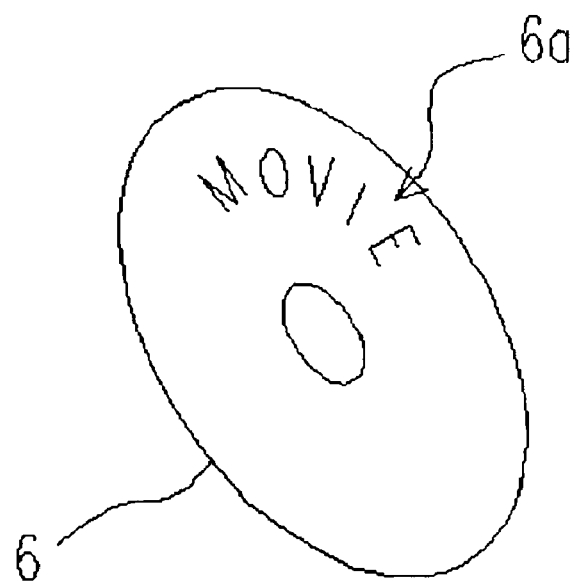
FIG. 5 is a perspective view showing an example of the DVD.

As a result, on a label surface of the DVD recorded and collected with movies, in the case when the guide information 6a such as "MOVIE" for easily recognizing the contents of the video information recorded on the DVD is printed or written for example as shown in FIG. 5A, the convenience of the video recording/reproducing system 1 is improved.

Figure 5B:
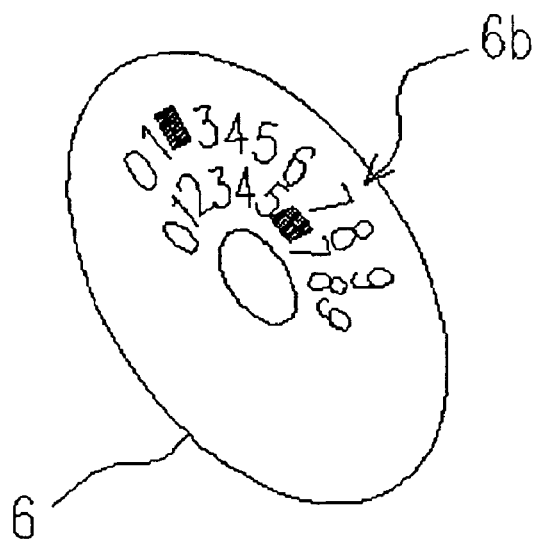

Furthermore, in the case when a plurality of DVD 6 are managed by using numbers, by spreading up the numbers in the number row 6b with numbers from "0" to "9" printed in advance on the label surface of the DVD 6 as shown in FIG. 5B for example, each DVD can be managed by using numbers. In FIG. 5B, the ID information is shown as "26".

Figure 6:
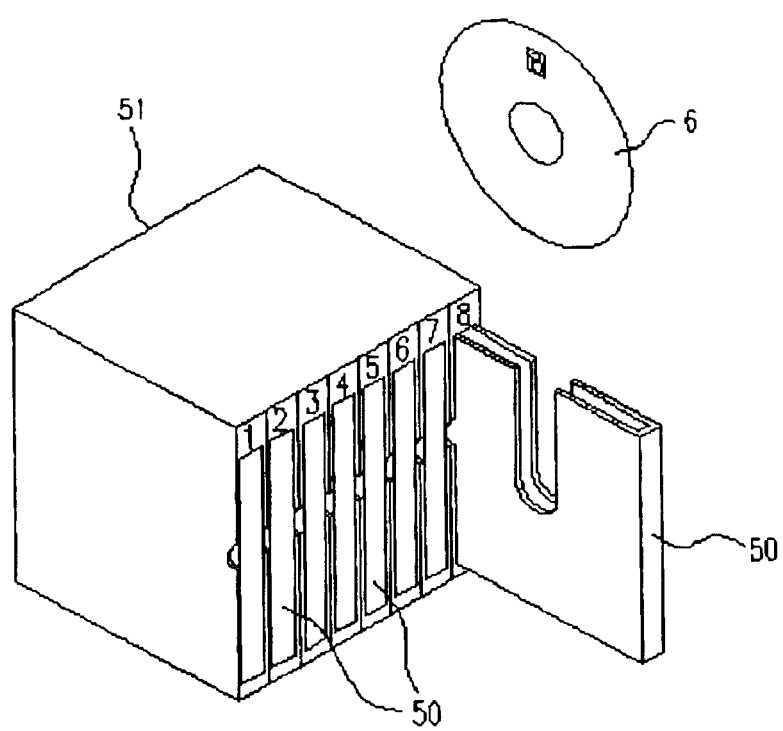
FIG. 6 is a perspective view showing an receiving example of the DVD.

Additionally, as shown in FIG. 6, the DVD 6 with visible and capable of being identified ID information a~g is received one by one in the stock storage 51, which has storage cases 50 with the ID information 1~8 same as this ID information 1~8, therefore searching the DVD 6 becomes simplified and the convenience of the video recording/reproducing system 1 can be improved.

Next, the second embodiment of the present invention will be explained referring to FIG. 7. The part same as that in the first embodiment is with the same numeral reference and the explanation thereof is omitted. The video recording/reproducing system 1 of the present embodiment regularly monitors the left capacity of the hard disc 16 without influencing the recording of the information.

On the RAM, the monitoring time area for storing the monitoring time referring to the left capacity monitoring process described latter can be maintained. The monitoring time is the information related to the period for monitoring the left capacity of the hard disc 16.

Moreover, on the RAM, regulation left capacity area for storing the regulation left capacity as the basic amount information referring to the left capacity monitoring process described latter is maintained. The regulation left capacity is the information related to the left capacity of the hard disc 16 such as one hour, or two hours in the present embodiment and is set to be the content capable of being video recorded at the preset time.

Additionally, on the RAM, the counter buffer for counting various time intervals is maintained in the left capacity monitoring process described latter.

Figure 7:
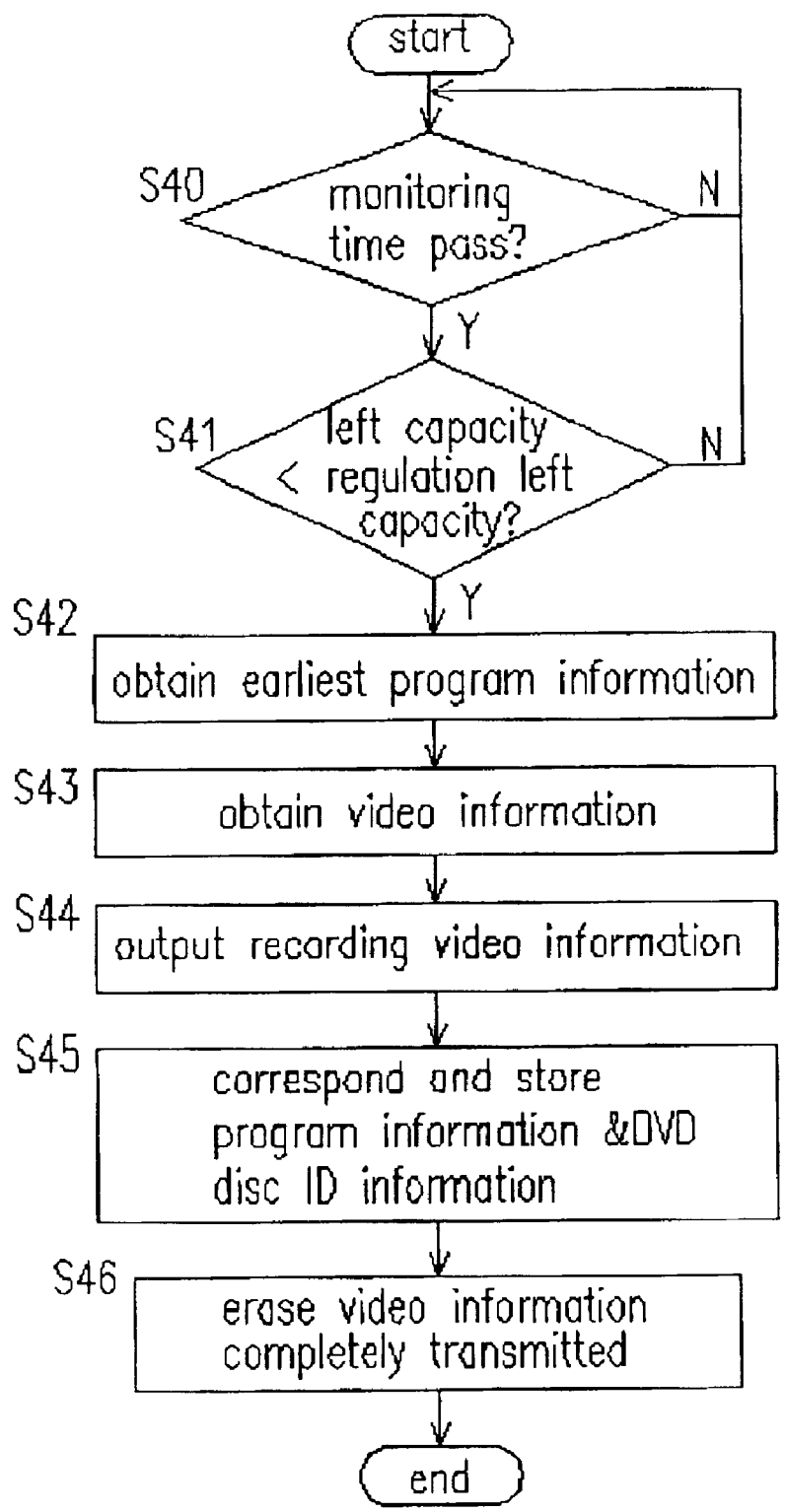
FIG. 7 is a schematic flow chart showing the information maintaining process according to the second embodiment of the present invention.

FIG. 7 is a schematic flow chart showing the left capacity monitoring process when practicing the video recording/reproducing system 1 according to the second embodiment of the present invention. In the left capacity monitoring process, by using a means for counting time with the CPU of the recorder controller, it is in a stand by state till it is judged that the preset monitoring time has gone (N in step S40). After it is judged that the monitoring time has gone (Y in step S40), it will be judged whether the left capacity of the hard disc 16 is smaller or larger than the preset regulation left capacity (S41).

If it is judged that the left capacity of the hard disc 16 is smaller than the preset regulation left capacity (Y in step S41), the directory 100 is searched and the video recorded on the earliest date will be obtained according to the video recording information (S42).

After that, the steps from S43 to S46 are practiced as the same process from the steps S5 to S8 as shown in FIG. 3.

As a result, no matter whether a presetting operation is practiced or not, the left capacity over and above the general regulation left capacity can be maintained. The general starting of the video recording can be assigned even by using the key operation of the input unit 7 without presetting video record.

If it is judged that the left capacity of the hard disc 16 is lager than the preset regulation left capacity (N in step S43), the process will moves to step S40.

Regarding the reproducing/searching of the information, because it is the same as that in the first embodiment, the explanation thereof is omitted.

Next, the third embodiment of the present invention will be explained referring to FIG. 8. In the present embodiment, the movement of the information moved from the hard disc 16 to the DVD can be grasped without input operations of ID information a~g acted by an operator.

Figure 8:
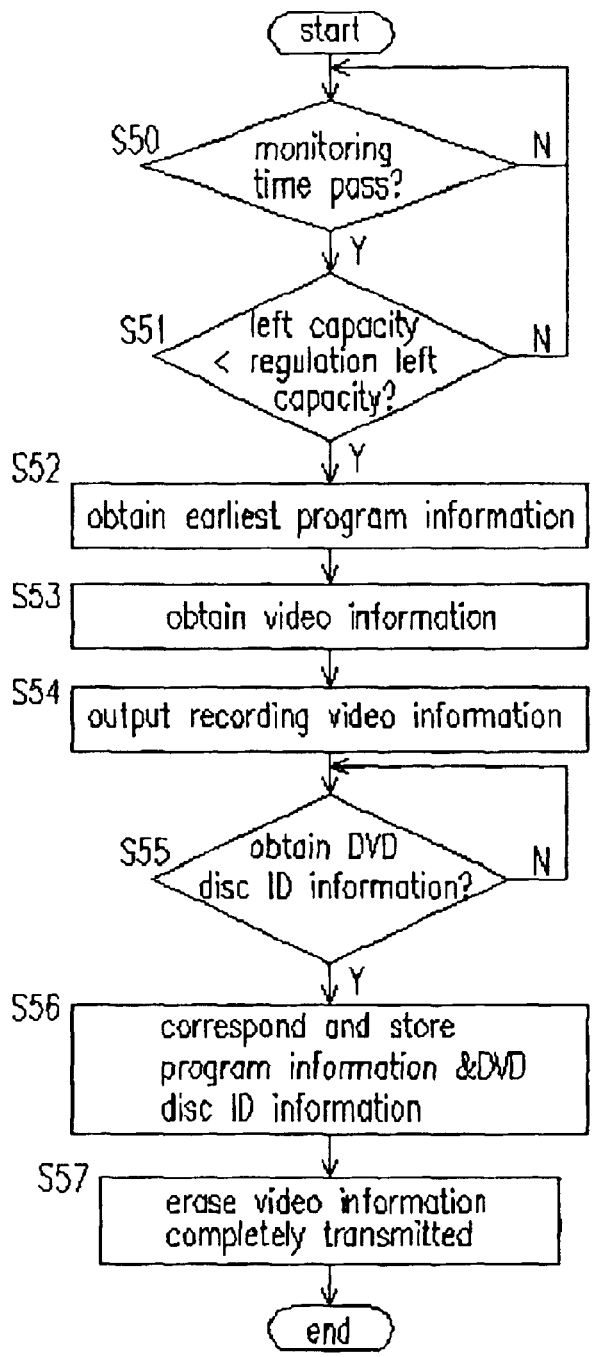
FIG. 8 is a schematic flow chart showing the left capacity monitoring process according to the third embodiment of the present invention.

FIG. 8 is a schematic flow chart of the left capacity monitoring process when practicing the video recording/reproducing system 1 according to the third embodiment of the present invention. In the left capacity monitoring process, the steps from S50 to S53 are practiced as the process from the steps S40 to S43 as shown in FIG. 7. The recording video information combined with the video information obtained in step S53, the recording command that makes the video information be recorded on the DVD 6 and the requirement command for requiring the ID information of the DVD 6 recorded with the video information is output to the DVD recorder 5 through the I/F 20 (S54).

It is not shown in the drawing that the DVD recorder 5 is in a stand by state till it is judged that the DVD recorder 5 receives the recording video information output through the recorder 3. After it is judged that the recording video information output through the recorder 3 is received, the video information combined to the recording command of the recording video information will be recorded on the DVD 6 and the ID information thereof will be output to the recorder 3 according to the received recording video information.

The recorder 3 is in a stand by state till it is judged that the recorder 3 receives the ID information output through the DVD recorder 5 (N in step S55). After it is judged that the ID information output through the DVD recorder 5 is received (Y in step S55), only the program information related to some video information completely transmitted will be made to correspond to the received ID information and will be stored in the directory 100 (S56).

Additionally, the video information completely transmitted is erased from the hard disc 16 (S57). As a result, the left capacity of the hard disc 16 is increased.

When searching the information, the same searching process as shown in FIG. 4 is practiced. In the information searching process of the present embodiment, during the recording of the video information, the ID information serving as the ID information of the target DVD 6 and displayed on the monitor 4 is read by the DVD recorder and transmitted to the recorder 3. Therefore, compared with manually inputting the ID information by an operator, the error inputting can be prevented.

Figure 9:
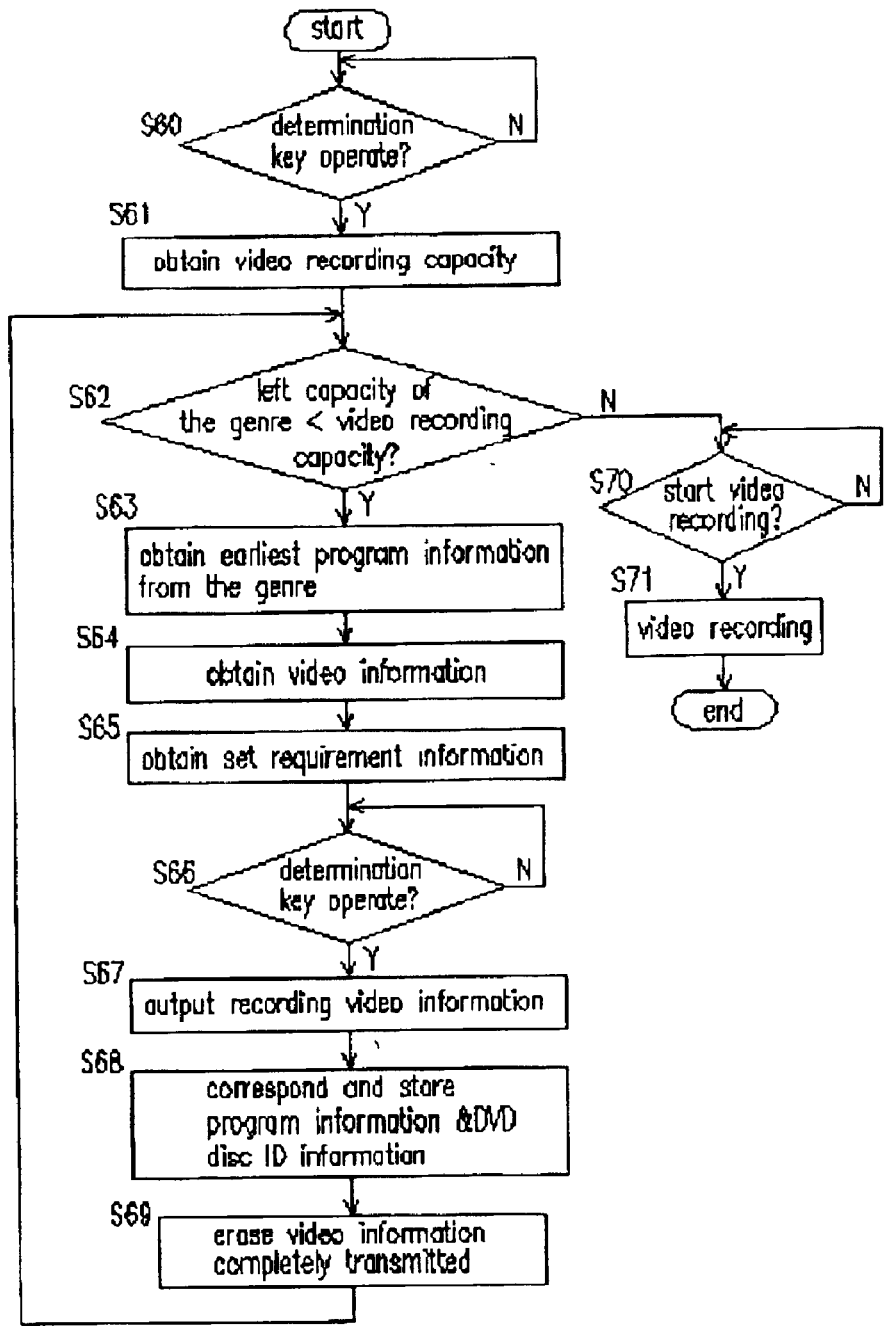
FIG. 9 is a schematic flow chart showing the information maintaining process according to the fourth embodiment of the present invention.

Next, the third embodiment of the present invention will be explained referring to FIG. 9. The hard disc 16 of the present embodiment is divided into memory ranges. The storage capacity of each divided memory range is optional. Each divided memory range can be respectively grouped into documentary, drama, movie etc.

Next, the information maintaining process will be explained referring to FIG. 9. The steps from S60 to S61 in the information maintaining process are practiced as the same process from the steps S1 to S2 as shown in FIG. 3.

The hard disc 16 is searched according to the preset information. The left capacity of the recording range for recording the program, whose genre is the same with that of the preset video record, is compared with the obtained video recording capacity in order to judge whether the video recording capacity is larger or smaller than the left capacity (S62).

When searching the hard disc 16 according to the preset information, if it is judged that the video recording capacity is larger than the left capacity of the recording range for recording the program whose genre is the same with that of the preset video record (Y in step S62), the directory 100 will be searched to obtain the program information on the earliest date in the program information with same genre as that of the preset video record (S63). The hard disc 16 is searched to obtain the video information corresponding to the obtained program information (S64).

Moreover, the setting requirement information, which is combined with the requirement information for requiring inserting the DVD 6 for recording the video information with the same genre as that of the preset video record and the display command that makes the requirement information be displayed on the monitor 4, is output to the monitor 4 through the I/F 18 (S65).

The operator sets the DVD 6 for recording the video information with the same genre as that of the preset video record on the turntable and operates the determination key by using the input unit 7.

Under the condition that the requirement information is displayed on the display unit of the monitor 4, the recorder 3 is in a stand by state till it is judged that the determination key is operated (N in step S66). Under the condition that the requirement information is displayed on the monitor 4, after it is judged that the determination key is operated (Y in step S66), the recording video information combined with the video information obtained in step S64 and the recording command that makes the video information be recorded on the DVD 6 is output to the DVD recorder 5 through the I/F 20 (S67).

After that, the process from steps S68 to S71 is practiced as the same process from steps S7 to S10 as shown in FIG. 3.

As a result, the left capacity of the hard disc 16 can be managed according to each genre. Therefore, only the video information with the same genre can be collected and recorded on the same DVD 6. Moreover, though each program information A~G is grouped into genres and maintained in the directory 100 in the present embodiment, it should not be a limitation. For example, it can also be grouped into actors, days etc.

Moreover, in the present embodiment, though various video information in the directory 100 is grouped into genres and stored and the left capacity is managed according to each genre, it should not be a limitation. For example, when storing the assigned video information on the hard disc 16 in sequence, at the timing that the total left capacity of the hard disc 16 is judged to be smaller than the video record capacity, the video information with the specific genre can be obtained and output to the DVD recorder 5. At this time, "the specific genre" can also be preset. "The specific genre" can also be assigned by operating the input unit 7 by an operator at the time that the total left capacity of the hard disc 16 is judged to be smaller than the video record capacity. When an operator operates the input unit 7, he can input the keyword for specifying the video information to be obtained and he also can input the information for assigning the video information respectively.

Regarding the information searching process, it is practiced as the same process as shown in FIG. 4, and the explanation thereof is omitted.

Next, the fifth embodiment of the present information will be explained referring to FIG. 10. In the public technique, the hard disc 16 is not always active during the storing of the information (the video information), while at the time when the information stored on the temporary memory area maintained on the RAM etc. is accumulated over and above a predetermined amount, the accumulated information is stored on the hard disc 16 at one time.

The video recording/reproducing system 1 of the present embodiment uses this kind of hard disc 16.

Figure 10:
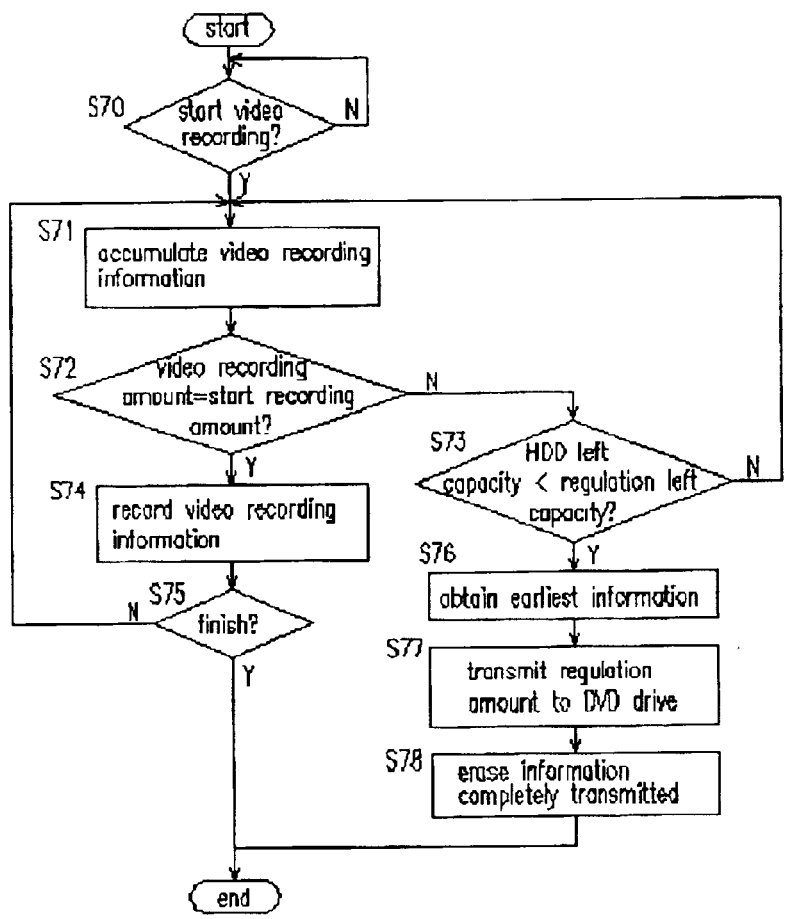
FIG. 10 is a schematic flow chart showing the information maintaining process according to the fifth embodiment of the present invention.

FIG. 10 is a schematic flow chart showing the information storing process when practicing the video recording/reproducing system 1 according to the fifth embodiment of the present embodiment. The information storing process is in a stand by state till it is judged that the operator operates the video recording key (N in step S70). After it is judged that the operator operates the video recording key (Y in step S70), the video information will be temporally accumulated on the accumulation area of the RAM (S71).

It is in a stand by state till it is judged that the video information accumulated on the accumulation area of the RAM arrives the start recording capacity (N in step S72) or till it is judged that the left capacity of the hard disc 16 is smaller than the regulation left capacity (N in step S73).

After it is judged that that the video information accumulated on the accumulation area of the RAM arrives at the start recording capacity (Y in step S72), the video information stored on the accumulation area will be stored on the hard disc 16 (S74).

The video information is being stored on the hard disc 16 till all the video information stored on the accumulation area is stored on the hard disc 16 (N in step S75). After it is judged that the all the video information stored on the accumulation area is stored on the hard disc 16 (Y in step S75), the process will move to step S71.

If it is judged that the left capacity of the hard disc 16 is smaller than the regulation left capacity (Y in step S73), the directory 100 will be searched to obtain the program information on the earliest date (S76).

The hard disc 16 is searched to obtain the video information corresponding to the obtained program information A~G (S77). The recording video information combined with the video information with a regulation-transmitting amount and the recording command that makes the video information be recorded on the DVD 6 is output to the DVD recorder 5 through the I/F 20.

It is not shown in the drawing that the DVD recorder 5 is in a stand by state till it is judged that the DVD recorder 5 receives the recording video information output through the recorder 3. After it is judged that the recording video information output through the recorder 3 is received, the video information combined to the recording command of the recording video information will be recorded on the DVD 6 according to the received recording video information.

Additionally, only the video information completely transmitted is erased from the hard disc 16 (S78).

In this way, even during the video recording of the video information, because the left capacity of the hard disc 16 can be monitored, that the video recording is interrupted resulting from insufficient left capacity can be prevented.

In accordance with one feature of this invention, the information processor comprises: a memory portion capable of erasing an information; a memory unit, selectively sorting an information provided from outside in the memory portion; a specific-information-obtaining unit, obtaining a specific information for specifying the information stored in the memory portion by using the memory unit; a sorting-and-maintaining unit, sorting and maintaining the specific information obtained by using the specific-information-obtaining unit according to the information stored in the memory portion by using the memory unit; a left capacity judging unit, judging whether a capacity that is not recorded yet in the memory portion is smaller than a basic information amount; a record-erasing unit, storing a part of the information stored in the memory portion on a portable information-recording medium and erasing the part of the information from the memory portion when the left capacity judging unit judges that the capacity not recorded yet is smaller than the basic information amount; an identification-information-obtaining unit, obtaining an identification information for identifying the information-recording medium recorded with the information by using the record-erasing unit; and a corresponding unit, corresponding and storing the identification information obtained by using the identification-information-obtaining unit to the specific information corresponding to the information erased from the memory portion by the record-erasing unit in the specific information sorted and maintained by using the sorting-and-maintaining unit. According to the information that is provided from outside and selective stored in the memory portion, the specific information for specifying this information is sorted and maintained. When the capacity not recorded yet in the memory portion is judged to be smaller than the basic information amount, a part of the information stored in the memory portion is stored on the portable information-recording medium and is erased from the memory portion. The identification information for identifying the information-recording medium stored with this information is corresponded to and stored in the specific information corresponding to the information erased from the memory portion in the specific information that has been maintained and stored. In this way, in the case when the information is assigned, the place maintained (stored or recorded) with this information can be specified according to the specific information. Therefore, the information can be recorded without depending on the storage capacity of the memory portion and the searching for the recorded information can be simplified. Moreover, by using the portable information-recording medium, the storage place for receiving the information-recording medium is not limited.

In accordance with another feature of this invention, the record-erasing unit erases the information from that stored in the memory portion at an earlier date and time. In this way, the information just stored in the memory portion will be prevented from being moved to the information-recording medium.

In accordance with still another feature of this invention, the left capacity judging unit judges whether the capacity not recorded yet is smaller than the basic information amount in each sort classification of the sorting-and-maintaining unit. The record-erasing unit erases the information from that stored at an earlier date and time in the sort classification where the left capacity judging unit judges the capacity not recorded yet is smaller than the basic information amount. In this way, the capacity not recorded yet in the memory portion can be managed in each sort classification.

In accordance with still another feature of this invention, the left capacity judging unit judges whether the capacity not recorded yet is smaller than the basic information amount when recording the information by using the memory unit. In this way, the left capacity in the memory portion can be maintained over and above the basic information amount during recording the information.

In accordance with still another feature of this invention, the left capacity judging unit judges whether the capacity not recorded yet is smaller than the basic information per regulation time interval. In this way, the left capacity in the memory portion can be always maintained over and above the basic information amount in every regulation time interval.

In accordance with still another feature of this invention, the information processor can further comprise: an input unit, inputting a keyword; a specific-information-searching unit, searching the specific information including the keyword input by using the input unit from the specific information stored by using the corresponding unit; an identification-information-obtaining unit, obtaining the identification information corresponding to the specific information searched by the specific-information-searching unit; and an identification-information-outputting unit, outputting the identification information obtained by the identification-information-obtaining unit. In this way, according to the input keyword, the place maintained (stored or recorded) with the information as the target can be specified. Therefore, the searching for the information recorded without depending on the storage capacity of the memory portion can be simplified.

In accordance with still another feature of this invention, the information processing method, used in an information processor comprising a memory portion capable of erasing an information, a memory unit for selectively storing an information provided from outside in the memory portion, comprises: a specific-information-obtaining step, for obtaining a specific information for specifying the information stored in the memory portion; a sorting-and-maintaining step, for sorting and maintaining the specific information according to the information stored in the memory portion; a record-erasing step, for storing a part of the information stored in the memory portion on a portable information-recording medium and erasing the part of the information from the memory portion when a capacity not recorded yet in the memory portion is smaller than a basic information amount; an identification-information-obtaining step, for obtaining an identification information for identifying the information-recording medium; and a corresponding step, for corresponding and storing the obtained identification information to the specific information corresponding to the information erased from the memory portion in the specific information that is stored and maintained. According to the information that is provided and selectively stored in the memory portion, the specific information for specifying this information is sorted and maintained. When the capacity not recorded yet in the memory portion is smaller than the basic information, a part of the information stored in the memory portion is stored on the portable information-recording medium and erased from the memory portion. The identification information for identifying the information-recording medium recorded with this information is corresponded to and stored in the specific information corresponding to the information erased from the memory portion in the specific information that has been sorted and maintained. As a result, in the case when the information is assigned, the place maintained (stored or recorded) with this information can be specified according to the specific information. Therefore, the information can be recorded without depending on the storage capacity of the memory portion, and the searching for the recorded information can be simplified. Moreover, by using the portable information-recording medium, the storage place for receiving the information-recording medium is not limited.

In accordance with still another feature of this invention, in the record-erasing step, the information is erased from that stored in the memory portion at an earlier date and time. In this way, the information just stored in the memory portion can be prevented from being erased from the memory portion by moving the information to the information-recording medium.

In accordance with still another feature of this invention, in the record-erasing step, the capacity not recorded yet is judged whether it is smaller than the basic information amount in each sort classification of the specific information. In the information in the sort classification where the capacity not recorded yet is judged to be smaller than the basic information amount, the information is erased from that stored at an earlier date and time. In this way, the capacity not recorded yet in the memory portion can be managed in each sort classification. Moreover, the information just stored in the memory portion can be prevented from being erased from the memory portion by moving the information to the information-recording medium.

In accordance with still another feature of this invention, in the record-erasing step, during recording the information in the memory portion, the capacity not recorded yet is judged whether it is smaller than the basic information amount. Therefore, during recording of the information, the left capacity in the memory portion can be always maintained over and above the basic information amount.

In accordance with still another feature of this invention, in the record-erasing step, the capacity not recorded yet is judged as to whether it is smaller than the basic information amount per regulation time interval. Therefore, in every regulation time interval, the left capacity in the memory portion can be maintained over and above the basic information amount.

In accordance with still another feature of this invention, the information processing method can further comprise: a specific-information-searching step, for searching for the specific information that includes a keyword input by using a input unit for inputting the keyword from the specific information stored in the memory portion; an identification-information-obtaining step, for obtaining the identification information corresponding to the searched specific information; and an identification-information-outputting step, for outputting the obtained identification information. Therefore, the specific information including the keyword input by the input unit is searched for in the stored specific information, and the identification information corresponding to this specific information is output. In this way, by inputting the keyword, the place maintained (stored or recorded) with the information as the target can be specified, and the information can be managed easily.

In accordance with still another feature of this invention, the information processing program, used in a computer provided by an information processor comprising a memory portion capable of erasing an information and a memory unit selectively storing the information provided from outside in the memory portion, comprises: a memory function for selectively storing the information provided from outside in the memory portion; a specific-information-obtaining-function for obtaining a specific information for specifying the information stored in the memory portion; a sorting-and-maintaining function for sorting and maintaining the specific information according to the information stored in the memory portion; a record-erasing function for storing a part of the information stored in the memory portion on a portable information-recording medium and erasing the part of the information from the memory portion when a capacity not recorded yet in the memory portion is smaller than a basic information amount; an identification-information-obtaining function for obtaining an identification information for identifying the information-recording medium; and a corresponding function for corresponding the obtained identification information to the specific information corresponding to the information erased from the memory portion in the specific information that is sorted and maintained. Therefore, in the case when the information is assigned, the place maintained (stored or recorded) with this information can be specified according to the specific information. The information can be recorded without depending on the capacity storage of the memory portion and the searching for the recorded information can be simplified.

In accordance with still another feature of this invention, the record-erasing function is for erasing the information from that stored in the memory portion at an earlier date and time. Therefore, the information just stored in the memory portion can be prevented from being erased from the memory portion by moving the information to the information-recording medium.

In accordance with still another feature of this invention, the record-erasing function is for judging whether the capacity not recorded yet is smaller than the basic information amount in each sort classification of the sorting-and-maintaining unit and erasing the information in the sort classification where the capacity not recorded yet is judged to be smaller than the basic information amount from that stored at an earlier date and time. Therefore, the capacity not recorded yet in the memory portion can be managed in each sort classification. Moreover, the information just stored in the memory portion can be prevented from being erased from the memory portion by moving the information to the information-recording medium.

In accordance with still another feature of this invention, the record-erasing function is for judging whether the capacity not recorded yet is smaller than the basic information amount during recording the information in the memory portion. Therefore, during recording of the information, the left capacity in the memory portion can be always maintained over and above the basic information amount.

In accordance with still another feature of this invention, the record-erasing function is for judging whether the capacity not recorded yet is smaller than the basic information amount per regulation time interval. Therefore, in each regulation time interval, the left capacity in the memory portion can be maintained over and above the basic information amount.

In accordance with still another feature of this invention, the information processing program can further comprise: a specific-information-searching function for searching for the specific information that includes an input keyword from the stored specific information; an identification-information-obtaining function for obtaining the identification information corresponding to the searched specific information; and an identification-information-outputting function for outputting the obtained identification information. Therefore, by inputting the keyword, the place maintained (stored or recorded) with the information as the target can be specified, and the information can be managed easily.

In accordance with still another feature of this invention, by using the recording medium of the present invention, the effects same as above can be achieved.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. An information processor, comprising:
   a memory portion capable of erasing an information;
   a memory unit, selectively sorting an information provided from outside in the memory portion;
   a specific-information-obtaining unit, obtaining a specific information for specifying the information stored in the memory portion by using the memory unit;
   a sorting-and-maintaining unit, sorting and maintaining the specific information obtained by using the specific-information-obtaining unit according to the information stored in the memory portion by using the memory unit;
   a left capacity judging unit, judging whether a capacity that is not recorded yet in the memory portion is smaller than a basic information amount;
   a record-erasing unit, storing a part of the information stored in the memory portion on a portable information-recording medium and erasing the part of the information from the memory portion when the left capacity judging unit judges that the capacity not recorded yet is smaller than the basic information amount;
   an identification-information-obtaining unit, obtaining an identification information for identifying the information-recording medium recorded with the information by using the record-erasing unit; and
   a corresponding unit, corresponding and storing the identification information obtained by using the identification-information-obtaining unit to the specific information corresponding to the information erased from the memory portion by the record-erasing unit in the specific information sorted and maintained by using the sorting-and-maintaining unit.

2. The information processor of claim 1, wherein the record-erasing unit erases the information from that stored in the memory portion at an earlier date and time.

3. The information processor of claim 1, wherein the left capacity judging unit judges whether the capacity not recorded yet is smaller than the basic information amount in each sort classification of the sorting-and-maintaining unit, and
   the record-erasing unit, erases the information from that stored at an earlier date and time in the sort classification where the left capacity judging unit judges the capacity not recorded yet is smaller than the basic information amount.

4. The information processor of claim 1, wherein the left capacity judging unit judges whether the capacity not recorded yet is smaller the basic information amount when recording the information by using the memory unit.

5. The information processor of claim 1, wherein the left capacity judging unit judges whether the capacity not recorded yet is smaller than the basic information per regulation time interval.

6. The information processor of claim 1, further comprising:
   an input unit, inputting a keyword;
   a specific-information-searching unit, searching for the specific information including the keyword input by using the input unit from the specific information stored by using the corresponding unit;
   an identification-information-obtaining unit, obtaining the identification information corresponding to the specific information searched by the specific-information-searching unit; and
   an identification-information-outputting unit, outputting the identification information obtained by the identification-information-obtaining unit.

7. An information processing method, used in an information processor comprising a memory portion capable of erasing an information, a memory unit for selectively storing an information provided from outside in the memory portion, comprising:
   a specific-information-obtaining step, for obtaining a specific information for specifying the information stored in the memory portion;
   a sorting-and-maintaining step, for sorting and maintaining the specific information according to the information stored in the memory portion;
   a record-erasing step, for storing a part of the information stored in the memory portion on a portable information-recording medium and erasing the part of the information from the memory portion when a capacity not recorded yet in the memory portion is smaller than a basic information amount;
   an identification-information-obtaining step, for obtaining an identification information for identifying the information-recording medium; and
   a corresponding step, for corresponding and storing the obtained identification information to the specific information corresponding to the information erased from the memory portion in the specific information that is stored and maintained.

8. The information processing method of claim 7, wherein in the record-erasing step, the information is erased from that stored in the memory portion at an earlier date and time.

9. The information processing method of claim 7, wherein in the record-erasing step, the capacity not recorded yet is judged as to whether it is smaller than the basic information amount in each sort classification of the specific information, and in the information in the sort classification where the capacity not recorded yet is judged to be smaller than the basic information amount, the information is erased from that stored at an earlier date and time.

10. The information processing method of claim 7, wherein in the record-erasing step, during recording the information in the memory portion, the capacity not recorded yet is judged as to whether it is smaller than the basic information amount.

11. The information processing method of claim 7, wherein in the record-erasing step, the capacity not recorded yet is judged as to whether it is smaller than the basic information amount per regulation time interval.

12. The information processing method of claim 7, further comprising:

a specific-information-searching step, for searching for the specific information including a keyword input by using an input unit for inputting the keyword from the specific information stored in the memory portion;

an identification-information-obtaining step, for obtaining the identification information corresponding to the searched specific information; and an identification-information-outputting step, for outputting the obtained identification information.

13. An information processing program, used in a computer provided by an information processor comprising a memory portion capable of erasing an information and a memory unit selectively storing the information provided from outside in the memory portion, comprising:

a memory function for selectively storing the information provided from outside in the memory portion;

a specific-information-obtaining-function for obtaining a specific information for specifying the information stored in the memory portion;

a sorting-and-maintaining function for sorting and maintaining the specific information according to the information stored in the memory portion;

a record-erasing function for storing a part of the information stored in the memory portion on a portable information-recording medium and erasing the part of the information from the memory portion when a capacity not recorded yet in the memory portion is smaller than a basic information amount;

an identification-information-obtaining function for obtaining an identification information for identifying the information-recording medium; and a corresponding function for corresponding the obtained identification information to the specific information corresponding to the information erased from the memory portion in the specific information that is sorted and maintained.

14. The information processing program of claim 13, wherein the record-erasing function is for erasing the information from that stored in the memory portion at an earlier date and time.

15. The information processing program of claim 13, wherein the record-erasing function is for judging whether the capacity not recorded yet is smaller than the basic information amount in each sort classification of the sorting-and-maintaining unit, and erasing the information in the sort classification where the capacity not recorded yet is judged to be smaller than the basic information amount from that stored at an earlier date and time.

16. The information processing program of claim 13, wherein the record-erasing function is for judging whether the capacity not recorded yet is smaller than the basic information amount during recording the information in the memory portion.

17. The information processing program of claim 13, wherein the record-erasing function is for judging whether the capacity not recorded yet is smaller than the basic information amount per regulation time interval.

18. The information processing program of claim 13, further comprising:

a specific-information-searching function for searching for the specific information including an input keyword from the stored specific information;

an identification-information-obtaining function for obtaining the identification information corresponding to the searched specific information; and an identification-information-outputting function for outputting the obtained identification information.

19. A recording medium, capable of storing and mechanically reading the information processing program of claim 13.

20. A recording medium, capable of storing and mechanically reading the information processing program of claim 14.

21. A recording medium, capable of storing and mechanically reading the information processing program of claim 15.

22. A recording medium, capable of storing and mechanically reading the information processing program of claim 16.

23. A recording medium, capable of storing and mechanically reading the information processing program of claim 17.

24. A recording medium, capable of storing and mechanically reading the information processing program of claim 18.

* * * * *